United States Patent
Tressler et al.

(12) 
(10) Patent No.: US 6,523,129 B1
(45) Date of Patent: Feb. 18, 2003

(54) METHOD OF PREVENTING COMPUTER MALFUNCTION DURING A CHANGE OF POWER CONSUMPTION STATES VIA DYNAMIC ADJUSTMENT OF CORE VOLTAGE

(75) Inventors: Christopher E. Tressler; Andrew W. Steinbach, both of Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 501 days.

(21) Appl. No.: 08/991,107

(22) Filed: Dec. 16, 1997

(51) Int. Cl.[7] .............................. G06F 1/26; G06F 1/28; G06F 1/30
(52) U.S. Cl. ........................... 713/340; 307/30; 327/13
(58) Field of Search ................................. 713/300–340; 307/30; 327/113

(56) References Cited

U.S. PATENT DOCUMENTS

| | | | | | |
|---|---|---|---|---|---|
| 4,599,523 A | * | 7/1986 | Pless et al. | .................... | 307/31 |
| 5,537,656 A | * | 7/1996 | Mozdzen et al. | ............ | 712/228 |
| 5,600,233 A | * | 2/1997 | Warren et al. | ............... | 323/237 |
| 5,852,377 A | * | 12/1998 | Pitsch | ......................... | 327/143 |

* cited by examiner

*Primary Examiner*—Rupal Dharia
(74) *Attorney, Agent, or Firm*—Williams, Morgan & Amerson, P.C.

(57) ABSTRACT

An improved method of preventing computer malfunction during a change of power consumption states is disclosed. The computer operates a microprocessor at a specified voltage during a normal operation. To offset the normal decrease in voltage due to an instantaneous increase in power requirements during a change of power consumption states, the specified voltage is increased prior to entering a higher power consumption state such that the voltage level remains within minimum operating limits.

20 Claims, 6 Drawing Sheets

METHOD OF PREVENTING COMPUTER MALFUNCTION DURING A CHANGE OF POWER CONSUMPTION STATES VIA DYNAMIC ADJUSTMENT OF CORE VOLTAGE

BACKGROUND OF THE INVENTION

1. Field of the Invention

This invention relates to operating voltages during normal and lower power consumption states on circuit boards implementing semiconductor chips.

2. Background

Computers historically have operated at two power consumption states: OFF and ON. During the ON state, the computer operates at a maximum specified voltage levels and maximum power consumption. During the OFF state, the computer is not operational, the voltage levels are zero, and power consumption is zero. With the advent of laptop computers and energy efficient desktop computers, computer designers have introduced the concept of lower power consumption states during regular computer operation. To establish lower power consumption states, unused portions of circuitry are shut off or put into a standby state. In some low power consumption states, the computer microprocessor clock is slowed down or turned off.

The microprocessor is a large power consumer in a computer, consuming more power and drawing more current at higher speeds. The microprocessor typically can operate at various voltages, consuming more power at higher voltage levels. The microprocessor is very sensitive to voltage levels. The higher the voltage level, the faster the operating speed capability and the higher the power consumption. The lower the voltage level, the slower the operating speed capability and the lower the power consumption. At voltages below a certain level, the microprocessor malfunctions. Microprocessor manufacturers strive to lower power consumption by lowering operating voltage levels while optimizing the operating speed capability of microprocessors.

During the changing of a computer from one power consumption state to another, the power consumption changes instantaneously. Stopping or starting the microprocessor clock changes the power requirements on a computer circuit board instantaneously. Current draw from the microprocessor may change from as little as 0.3 amps to as much as 10 amps in one microprocessor clock cycle. The power supply cannot instantaneously increase or decrease power output and may take several microseconds to regulate the power output. As a result, after a change in power consumption state of the computer, the voltage level output from the power supply experiences large dips and rises due an increase or decrease of current draw. When the state of the computer changes from a higher to lower power consumption rate, the voltage level rises as the current draw from the computer decreases. The power supply decreases the power output and the voltage level returns to normal. When the state of the computer changes from a lower power consumption rate, the voltage level falls as the current draw from the computer increases. The power supply increases the power output and the voltage level returns to normal. At times, the voltage level may dip below the minimum operating voltage of the microprocessor, causing the computer to malfunction. When the voltage drops below the minimum operating voltage of the microprocessor, internal timing requirements may not be met causing incorrect data to be fetched from cache or other such errors.

To keep the voltage level within an operational range, computer designers have added large capacitors to computer circuit boards. The large capacitors are expensive and use valuable circuit board space, making them an undesirable solution.

SUMMARY OF THE INVENTION

A method of preventing computer malfunction during a change of power consumption states while reducing capacitor requirements is disclosed. Prior to a transition from a lower power consumption state to a higher power consumption state the voltage level supplied by the power supply is increased such that when the computer returns to the higher power consumption state, the voltage level remains within minimum operating limits.

A further understanding of the nature and advantages of the present invention may be realized by reference to the remaining portions of the specification and the drawings.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

DETAILED DESCRIPTION OF PREFERRED EMBODIMENTS

Figure 1:
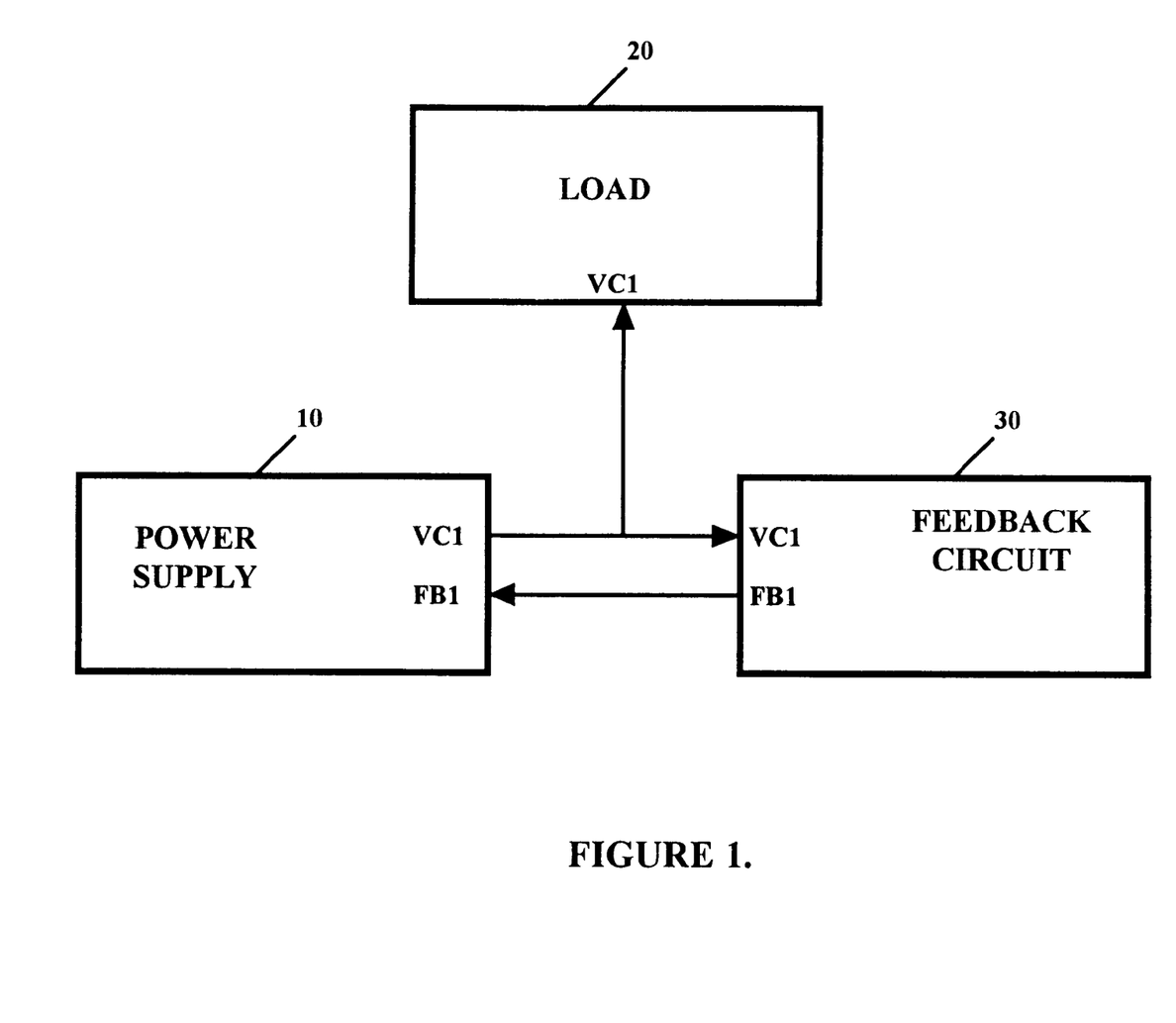
FIG. 1 is a block diagram of a typical circuit board implementation.

FIG. 1 is a block diagram of a typical circuit board implementation. Power supply 10 supplies voltage VC1 to load 20 and feedback circuit 30. Power supply 10 is typically a linear or a switching power supply. Load 20 is a circuit containing, among other things, semiconductor chips such as a microprocessor and memory. Load 20 is capable of multiple power consumption states. Feedback circuit 30 monitors voltage VC1. Feedback signal FB1 from feedback circuit 30 is sent to power supply 10 to indicate adjustments required in voltage levels. Power supply 10 adjusts the power output to maintain voltage VC1 within desired levels. As the power requirements of load 20 change, the voltage VC1 experiences dips and rises since power supply 10 cannot instantaneously regulate its power output level.

Figure 2:
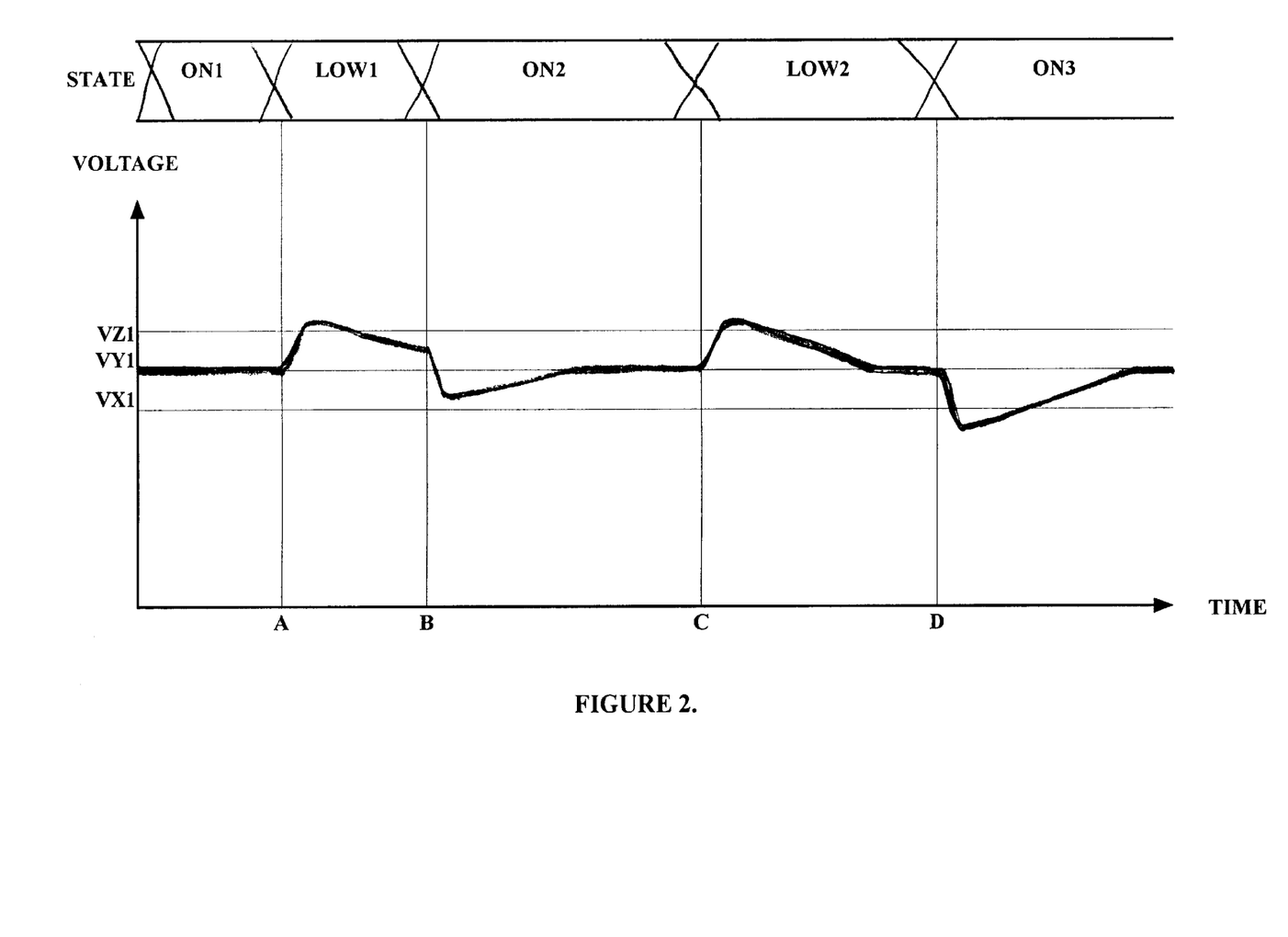
FIG. 2 is a graph showing the voltage level output from a typical power supply during state changes of the typical circuit board not implementing corrective capacitors.

FIG. 2 is a graph showing the voltage level output from a typical power supply during state changes of the typical circuit board not implementing corrective capacitors. Two cycles of state changes from normal to low power consumption states are shown from left to right. VX1 is the minimum operating voltage of load 20. When the voltage drops below VX1, load 20 malfunctions. VY1 is the typical operating voltage of load 20. VZ1 is an arbitrary voltage level above VY1. Full operation of load 20 still occurs at VZ1. During the state On1, voltage output of power supply 10 remains approximately VY1. State On1 is a normal power consumption state of load 20. During a normal power consumption state of load 20, the computer is fully functional, operating at maximum speeds and voltage levels, and consuming maximum power. FIG. 2 does not show an off state, where VC1 is zero volts, the computer is not functional and is consuming minimum power.

At time A, the state changes from state On1 to state Low1. State Low1 is a low power consumption state of load 20. Due to the change in power consumption of load 20 and the inability of the power supply to instantaneously regulate power output, voltage VC1 rises above VZ1. Voltage VC1 slowly decreases back to VY1 as power supply 10 adjusts the power and voltage levels.

At time B, the state of load 20 changes from state Low1 to state On2. State On2 is a normal power consumption state of load 20. State Low1 was of a short duration such that voltage VC1 has not fully decreased and stabilized at VY1. Due to the increase in power consumption of load 20, voltage VC1 dips below VY1. Voltage VC1 slowly increases back to VY1 as power supply 10 adjusts the power and voltage levels.

At time C, the state of load 20 changes from state On2 to state Low2. State Low2 is a low power consumption state of load 20. Due to the decrease in power consumption of load 20, voltage VC1 rises above VZ1. Voltage VC1 slowly decreases back to VY1 as power supply 10 adjusts the power and voltage levels.

At time D, the state of load 20 changes from state Low2 to state On3. State On3 is a normal power consumption state of load 20. State Low2 was of a long duration such that voltage VC1 has fully decreased and stabilized at VY1. Due to the increase in power consumption of load 20, voltage VC1 dips below VX1, the minimum operating voltage of load 20. When voltage VC1 dips below VX1, the semiconductor chips in load 20 malfunction.

The malfunction of the semiconductor chips in load 20 can be prevented by adding expensive and bulky capacitors to load 20 to stabilize the voltage VC1 around VY1.

Figure 3:
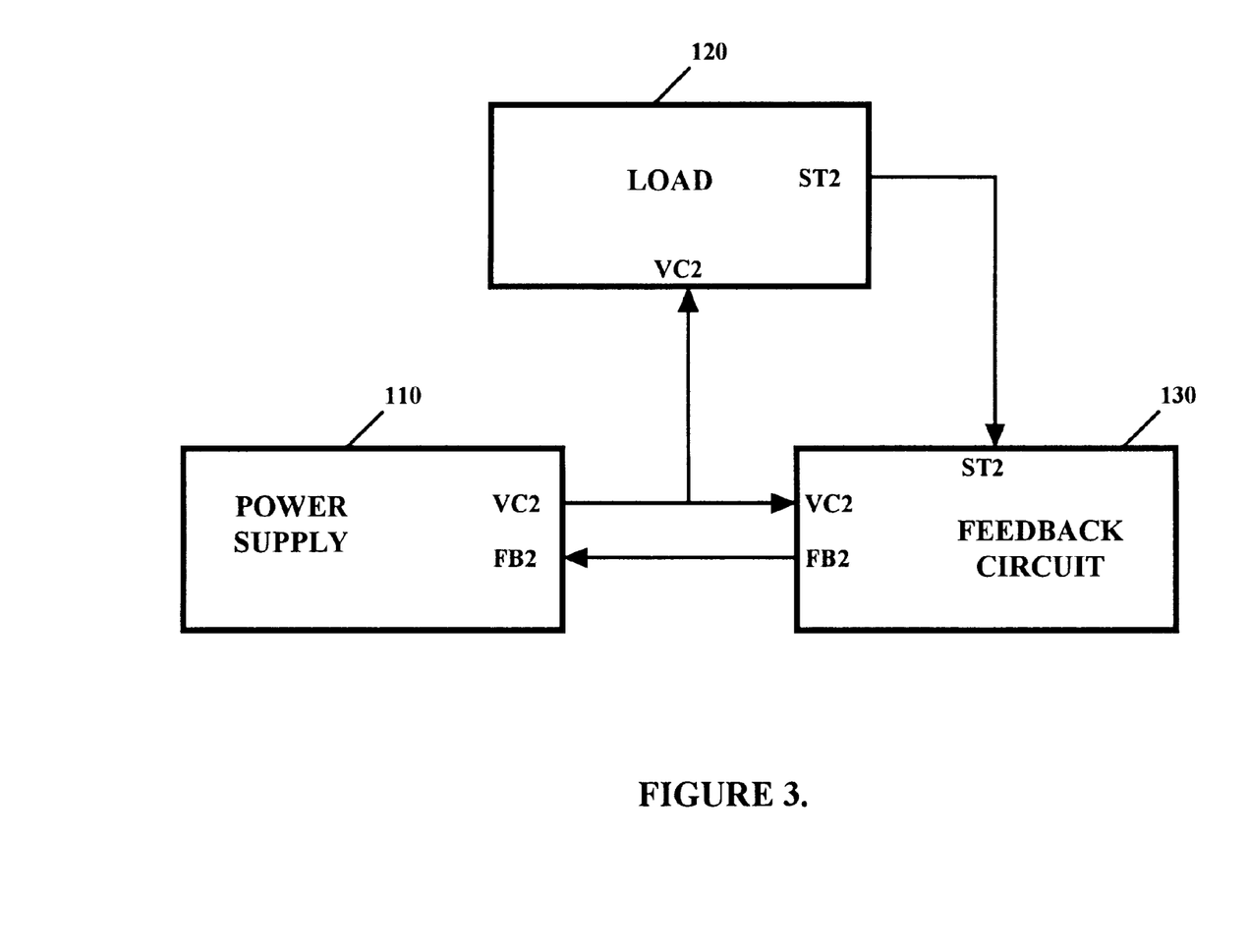
FIG. 3 is a block diagram of the preferred embodiment of a circuit board implementing the present invention.

FIG. 3 is a block diagram of the preferred embodiment of a circuit board implementing the present invention. Power supply 110 supplies voltage VC2 to load 120 and feedback circuit 130. Power supply 110 is typically a linear or a switching power supply. Load 120 is a circuit containing, among other things, semiconductor chips such as a microprocessor, memory and power consumption state logic. Load 120 is capable of operating at multiple power consumption states. The state signal ST2, sent from load 120 to feedback circuit 130, communicates power consumption state information of load 120. The state information communicated may indicate the current power consumption state at which load 120 is operating or indicate upcoming power consumption state change information. Feedback circuit 130 monitors voltage VC2 and state signal ST2 and generates feedback signal FB2. Feedback signal FB2 from feedback circuit 130 is sent to power supply 110 to indicate adjustments required in voltage levels. Power supply 110 adjusts the power output to maintain voltage VC2 within desired levels.

Figure 4:
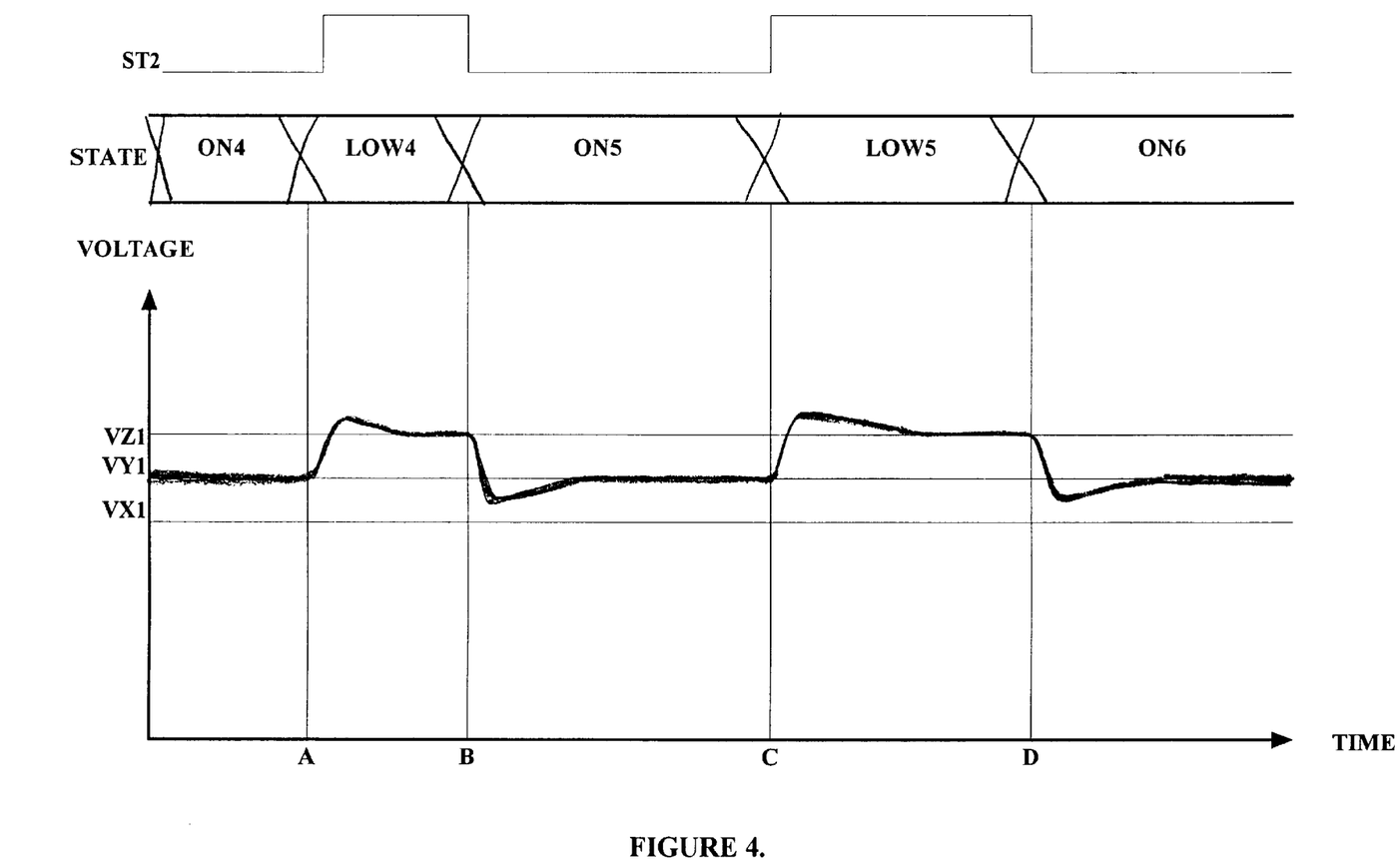
FIG. 4 is a graph showing the voltage level output from a typical power supply during state changes of the typical circuit board implementing a first embodiment of the present invention.

FIG. 4 is a graph showing the voltage level output from a typical power supply during state changes of the typical circuit board implementing a first embodiment of the present invention. In this first embodiment, state signal ST2 of FIG. 3 indicates the current power consumption state of load 120. During a lower power consumption state the voltage level VC2 supplied by power supply 110 is increased such that when the computer returns to a higher power consumption state, the voltage level VC2 remains within minimum operating limits.

Two cycles of state changes from normal to low power consumption states are shown from left to right. VX2 is the minimum operating voltage of load 120. When the voltage drops below VX2, load 120 malfunctions. VY2 is the typical operating voltage of load 120. VZ2 is a voltage level above VY2 such that a state change from a low power consumption state to a higher power consumption state will not cause voltage VC2, starting from VZ2, to dip below the minimum operating voltage VX2. During the State On4, the voltage output of power supply 110 remains at approximately VY2. State On4 is a normal power consumption state of load 120. During a normal power consumption state of load 120, the computer is fully functional, operating at maximum speeds and voltage levels, and consuming maximum power. FIG. 4 does not show an off state, where VC2 is zero volts, the computer is not functional and is consuming minimum power.

At time A, the state changes from State On4 to State Low4. Low4 is a low power consumption state of load 120. At time A, state signal ST2 also changes to indicate the change in power consumption states. The change in the state signal ST2 causes feedback circuit 130 to cause feedback signal FB2 to indicate to power supply 110 to drive output voltage VC2 to VZ2. Due to the change in power consumption of load 120, voltage VC2 rises above VZ2. Voltage VC2 slowly decreases back to VZ2 as power supply 110 adjusts the power and voltage levels.

At time B, the state of load 120 changes from state Low4 to state On5. State On5 is a normal power consumption state of load 120. At time B, state signal ST2 also changes to indicate the change in power consumption states. The change in the state signal ST2 causes feedback circuit 130 to cause feedback signal FB2 to indicate to power supply 110 to drive output voltage VC2 to VY2. State Low4 was of a short duration such that voltage VC2 has not fully decreased and stabilized at VZ2. Due to the increase in power consumption of load 120, voltage VC2 dips below VY2. Voltage VC2 slowly increases back to VY2 as power supply 110 adjusts the power and voltage levels.

At time C, the state of load 120 changes from state On5 to state Low5. State Low5 is a low power consumption state of load 120. At time C, state signal ST2 also changes to indicate the change in power consumption states. The change in the state signal ST2 causes feedback circuit 130 to cause feedback signal FB2 to indicate to power supply 110 to drive output voltage VC2 to VZ2. Due to the decrease in power consumption of load 120, voltage VC2 rises above VZ2. Voltage VC2 slowly decreases back to VZ2 as power supply 110 adjusts the power and voltage levels.

At time D, the state of load 120 changes from state Low5 to state On6. State On6 is a normal power consumption state of load 20. State Low5 was of a long duration such that voltage VC2 has fully decreased and stabilized at VZ2. Due to the increase in power consumption of load 120, voltage VC2 dips below VY2, but not below VX2.

The first embodiment of the present invention increases the average operating voltage during low power consumption states. During the change of states from lower to higher power consumption states, the voltage does not dip below non-functional levels. By only increasing the voltage VC2 during low power consumption states, overall power consumption of load 120 is only nominally affected. The need for large, expensive capacitors on the circuit board is reduced.

Figure 5:
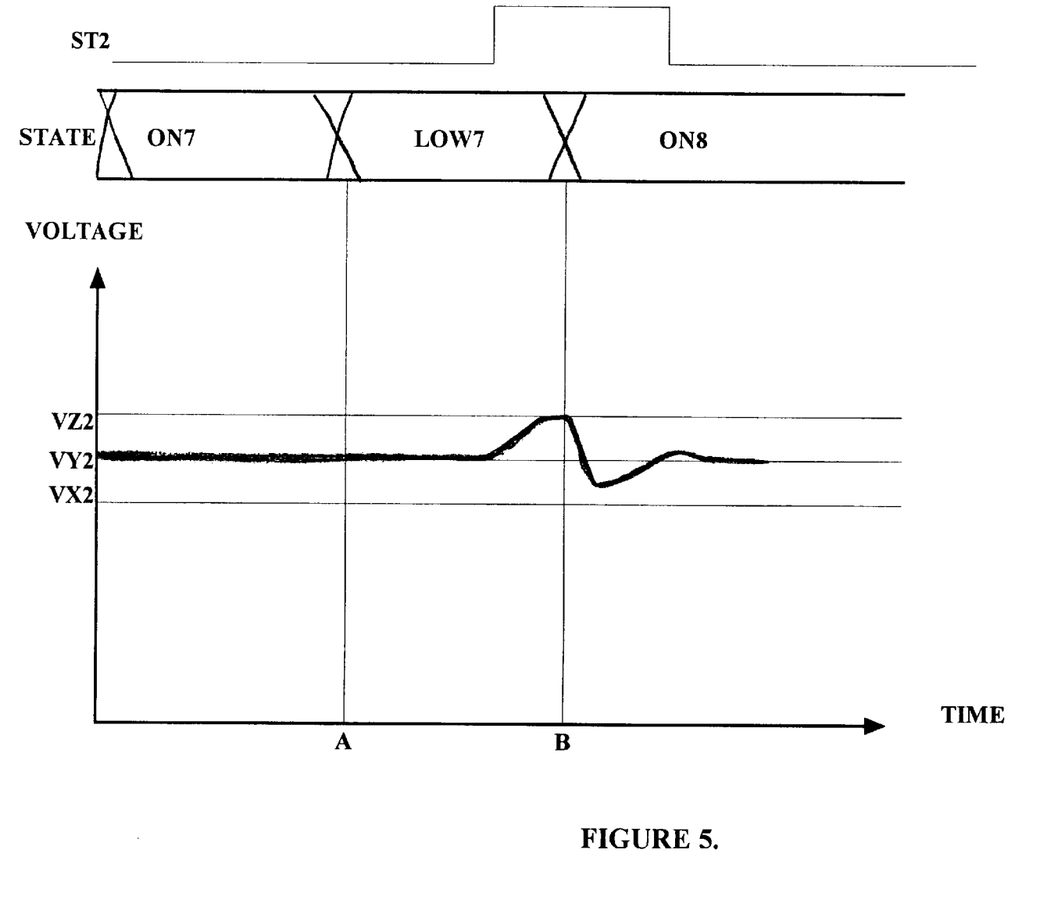
FIG. 5 is a graph showing the voltage level output from a typical power supply during state changes of the typical circuit board implementing a second embodiment of the present invention.

FIG. 5 is a graph showing the voltage level output from a typical power supply during state changes of the typical circuit board implementing a second embodiment of the present invention. In this second embodiment, state signal ST2 of FIG. 3 indicates an upcoming state change of load 120 from a lower to a higher power consumption state. A change in state signal ST2 needs to precede a change in power consumption state of load 120 an amount of time sufficient for power supply 110 to increase the voltage level VC2 to a level such that when load 120 changes states from a lower to a higher power consumption state the voltage VC2 does not dip below operational levels of load 120.

One cycle of state changes from normal to low power consumption states are shown from left to right. VX2 is the minimum operating voltage of load 120. When the voltage VC2 drops below VX2, load 120 malfunctions. VY2 is the typical operating voltage of load 120. VZ2 is a voltage level above VY2 such that a state change from a low power consumption state to a higher power consumption state will not cause voltage VC2, starting from VZ2, to dip below the minimum operating voltage VX2. During the State On7, the voltage output of power supply 110 remains at approximately VY2. State On7 is a normal power consumption state of load 120. During a normal power consumption state of load 120, the computer is fully functional, operating at maximum speeds and voltage levels, and consuming maximum power. FIG. 5 does not show an off state, where VC2 is zero volts, the computer is not functional and is consuming minimum power.

At time A, the state changes from State On7 to State Low7. Low7 is a lower power consumption state of load 120. Due to the change in power consumption of load 120, voltage VC2 rises above VZ2. Voltage VC2 slowly decreases back to VZ2 as power supply 110 adjusts the power and voltage levels.

Just prior to time B, state signal ST2 changes to indicate an upcoming change in power consumption states. The change in the state signal ST2 causes feedback circuit 130 to cause feedback signal FB2 to indicate to power supply 110 to drive output voltage VC2 to VZ2. State signal ST2 always precedes a change in power consumption state of load 120 such that the voltage VC2 is driven to and stabilized at VZ2 prior to the change of power consumption state of load 120.

At time B, voltage level VC2 is VZ2, and the state of load 120 changes from state Low7 to state On8. State On8 is a normal power consumption state of load 120. Due to the increase in power consumption of load 120, voltage VC2 dips below VY2, but not below VX2.

Some time after time B, state signal ST2 also changes to indicate to the feedback circuit 130 to cause feedback signal FB2 to indicate to power supply 110 to drive output voltage VC2 to VY2.

The second embodiment of the present invention increases the average operating voltage just prior to a transition from a low power consumption state to a higher power consumption state. During the change of states of load 120 from lower to higher power consumption states, the voltage does not dip below non-functional levels. By only increasing the voltage VC2 just prior to the transition from a lower power consumption state to a higher power consumption state, overall power consumption of load 120 is only nominally affected. The need for large, expensive capacitors on the circuit board is reduced.

Figure 6:
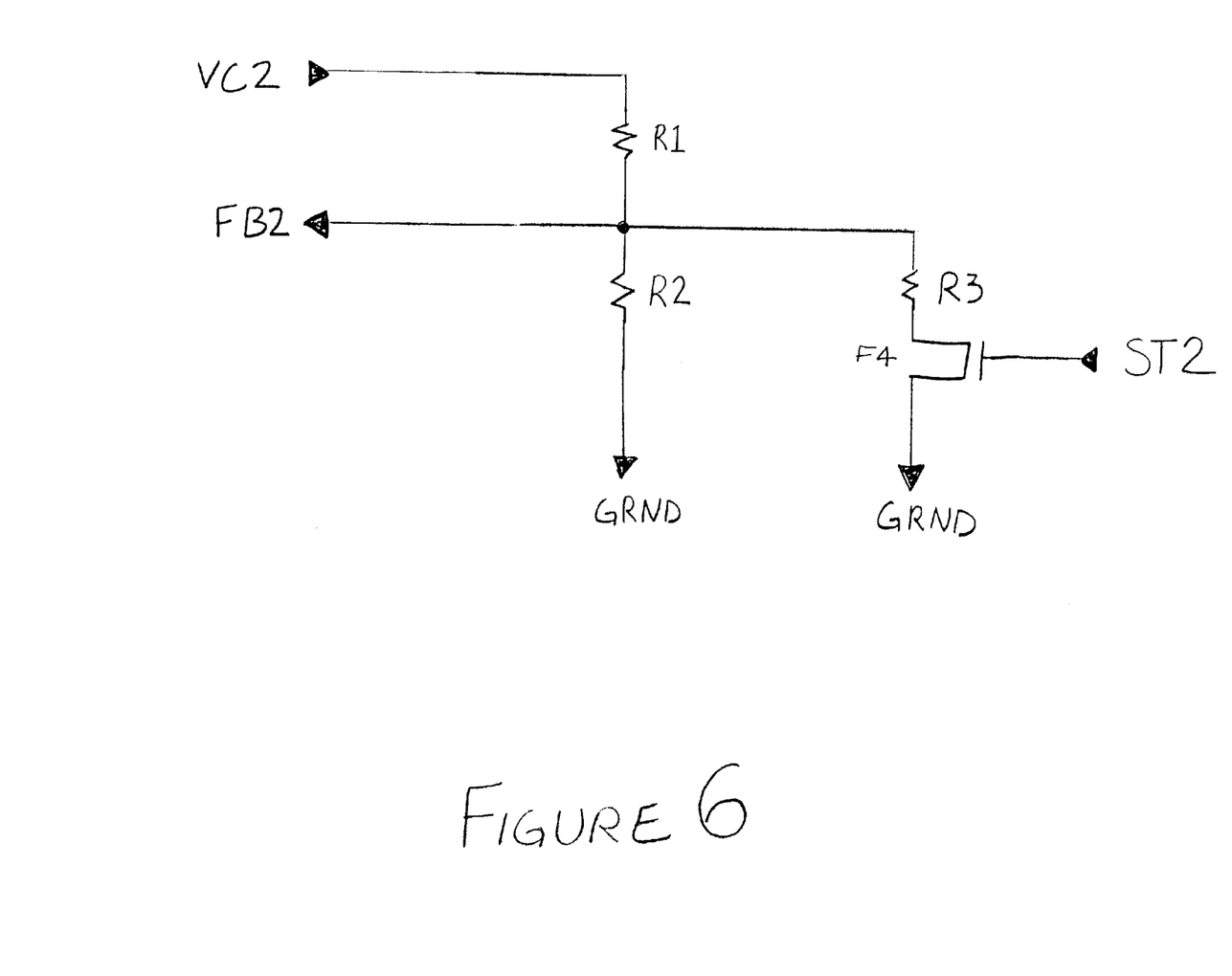
FIG. 6 is a preferred embodiment of a feedback circuit of the typical computer circuit board implementing the present invention.

FIG. 6 is a preferred embodiment of a feedback circuit of the typical computer circuit board implementing the present invention. Shown is a very simple feedback circuit. The addition of voltage requirements, power planes on the circuit board, multiple power consumption states, and various other features will increase the complexity of the feedback circuit.

Voltage level VC2 is input to a first terminal of resistor R1. A second terminal of resistor R1 is connected to a first terminal of resistor R2, a first terminal of resistor R3 and is feedback signal FB2. A second terminal of resistor R2 is connected to a ground signal, GRND. A second terminal of resistor R3 is connected to a source terminal of FET F4. A drain terminal of FET F4 is connected to the ground signal, GRND. A gate terminal of FET F4 is connected to state signal ST2.

State signal ST2 turns FET F4 on and off. FET F4 is off when state signal ST2 is low, during the On States shown in FIG. 4 of the first embodiment of the present invention, and most of the On and Low states of FIG. 5 of the second embodiment of the present invention. The On States are normal power consumption states of load 120, the computer is fully functional, operating at maximum speeds and voltage levels, and consuming maximum power. Resistors R1 and R2 are values such that when FET F4 is off, feedback signal FB2 indicates to power supply 110 to regulate voltage VC2 to load 120 at voltage level VY2.

FET F4 is on when state signal ST2 is high, during the Low States shown in FIG. 4 of the first embodiment of the present invention, and just prior to and just after a change from lower to higher power consumption state of load 120 of FIG. 5. The Low States are lower power consumption states of load 120. Resistor R3 is a value such that when FET F4 is on, feedback signal FB2 indicates to power supply 110 to regulate voltage VC2 to load 120 at voltage level VZ2.

The present invention increases the average operating voltage during low power consumption states or just prior to a transition from a lower power consumption state to a higher power consumption state. During the change of states from lower to higher power consumption states, the voltage does not dip below non-functional levels.

The present invention corrects the problem of voltage dipping into non-functional levels by increasing the voltage output supplied by the power supply during the transition from lower to higher power consumption states. By only increasing the voltage during this time, overall power consumption is only nominally affected. The need for large, expensive capacitors on the circuit board is reduced.

Although the description above describes only two different power consumption states, the present invention can be extended to multiple power consumption states and multiple voltage levels. The multiple states may be achieved by assigning different states to different operating speeds of the microprocessor and different on, off and standby conditions of various computer peripherals.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of preventing computer malfunction during a change in power consumption states, comprising:

providing power at a first voltage level to a load, the load having a low power consumption state and a high power consumption state;

receiving power consumption state information; and increasing the first voltage level to a second voltage level based on the power consumption state information indicating an impending transition from the low power consumption state to the high power consumption state.

2. The method of claim 1, wherein the load induces a voltage drop in the power provided to the load during the transition from the low power consumption state to the high power consumption state, and increasing the first voltage level includes increasing the first voltage level to the second voltage level, the second voltage level being at least the voltage drop plus a minimum operating voltage associated with the load.

3. The method of claim 1, further comprising configuring a power supply to provide power to the load at the second voltage level during at least the transition from the low power consumption state to the high power consumption state based on the power consumption state information.

4. The method of claim 3, wherein the power consumption state information comprises a logic signal that is asserted while the load is in the low power consumption state and deasserted while the load is in the high power consumption state, and configuring the power supply includes configuring the power supply to provide power to the load at the first voltage level in response to the logic signal being asserted and to provide power to the load at the second voltage level in response to the logic signal being deasserted.

5. The method of claim 1, wherein increasing the first voltage level includes increasing the first voltage level to the second voltage level in response to the load entering the low power consumption state.

6. The method of claim 1, wherein increasing the first voltage level includes increasing the first voltage level to the second voltage level a first predetermined amount of time before the transition from the low power consumption state to the high power consumption state.

7. The method of claim 6, further comprising decreasing the second voltage level to the first voltage level a second predetermined amount of time after the transition from the low power consumption state to the high power consumption state.

8. The method of claim 1, wherein the power consumption state information comprises a logic signal that is asserted a first predetermined period of time before the transition from the low power consumption state to the high power consumption state, and increasing the first voltage level to the second voltage level includes increasing the first voltage level to the second voltage level in response to the logic signal being asserted.

9. The method of claim 8, wherein the logic signal is deasserted a second period of time after the transition from the low power consumption state to the high power consumption state, and the method further comprises decreasing the second voltage level to the first voltage level in response to the logic signal being deasserted.

10. An apparatus, comprising:

a load having at least a first power consumption state and a second, higher power consumption state;

a power supply coupled to the load and being adapted to supply power to the load, the power supply having at least first and second voltage levels, the second voltage level being higher than the first voltage level; and a feedback circuit coupled to the power supply and adapted to receive a power consumption state signal indicating an impending transition from the low power consumption state to the high power consumption state and configure the power supply to provide power at the second voltage level during at least the transition from the low power consumption state to the high power consumption state.

11. The apparatus of claim 10, wherein the load has a minimum operating voltage, the load induces a voltage drop in the power provided to the load by the power supply during the transition from the low power consumption state to the high power consumption state, and the second voltage level comprises at least the voltage drop plus the minimum operating voltage.

12. The apparatus of claim 10, wherein the load is adapted to provide the power consumption state signal.

13. The apparatus of claim 10, wherein the power consumption state signal indicates the current power consumption state of said load.

14. The apparatus of claim 13, wherein the power consumption logic signal is asserted while the load is in the low power consumption state and deasserted while the load is in the high power consumption state, and the feedback circuit is adapted to configure the power supply to provide power to the load at the first voltage level in response to the logic signal being asserted and to provide power to the load at the second voltage level in response to the logic signal being deasserted.

15. The apparatus of claim 10, wherein the feedback circuit is adapted to configure the power supply to provide power to the load at the second voltage level in response to the load entering the low power consumption state.

16. The apparatus of claim 10, wherein the feedback circuit is adapted to configure the power supply to provide power to the load at the second voltage level a first predetermined amount of time before the transition from the low power consumption state to the high power consumption state.

17. The apparatus of claim 16, wherein the feedback circuit is adapted to configure the power supply to provide power to the load at the first voltage level a second predetermined amount of time after the transition from the low power consumption state to the high power consumption state.

18. The apparatus of claim 10, wherein the power consumption logic signal is asserted a first predetermined period of time before the transition from the low power consumption state to the high power consumption state, and the feedback circuit is adapted to configure the power supply to provide power to the load at the second voltage level in response to the logic signal being asserted.

19. The apparatus of claim 18, wherein the logic signal is deasserted a second period of time after the transition from the low power consumption state to the high power consumption state. and the feedback circuit is adapted to configure the power supply to provide power to the load at the first voltage level in response to the logic signal being deasserted.

20. The apparatus of claim 10, wherein the load comprises a computer circuit board.

* * * * *